United States Patent
Chen et al.

(10) Patent No.: US 8,078,702 B2
(45) Date of Patent: Dec. 13, 2011

(54) METHOD FOR DETECTING A NODE OF A SERVER DEVICE

(75) Inventors: Chih-Wei Chen, Taipei (TW); Hsiao-Fen Lu, Taipei (TW)

(73) Assignee: Inventec Corporation, Taipei (TW)

( * ) Notice: Subject to any disclaimer, the term of this patent is extended or adjusted under 35 U.S.C. 154(b) by 321 days.

(21) Appl. No.: 12/571,450

(22) Filed: Oct. 1, 2009

(65) Prior Publication Data
US 2011/0029646 A1 Feb. 3, 2011

(30) Foreign Application Priority Data
Jul. 29, 2009 (TW) .............................. 98125583 A

(51) Int. Cl.
*G06F 15/177* (2006.01)
*G06F 12/00* (2006.01)

(52) U.S. Cl. ...................................... 709/220; 709/221

(58) Field of Classification Search .................. 709/203, 709/220–222, 226, 229, 250
See application file for complete search history.

(56) References Cited

U.S. PATENT DOCUMENTS

| | | | |
|---|---|---|---|
| 6,707,380 B2 * | 3/2004 | Maloney | 340/568.1 |
| 7,600,132 B1 * | 10/2009 | Mahmoud | 713/192 |
| 2003/0105904 A1 * | 6/2003 | Abbondanzio et al. | 710/302 |
| 2003/0120822 A1 * | 6/2003 | Langrind et al. | 709/251 |
| 2005/0028100 A1 * | 2/2005 | Rommelmann et al. | 715/705 |
| 2005/0113957 A1 * | 5/2005 | Gallu et al. | 700/110 |
| 2006/0192000 A1 * | 8/2006 | Cho | 235/380 |
| 2008/0040535 A1 * | 2/2008 | Fisher et al. | 711/111 |

* cited by examiner

*Primary Examiner* — Zarni Maung
(74) *Attorney, Agent, or Firm* — CKC & Partners Co., Ltd.

(57) ABSTRACT

A method for detecting a node of a server device includes the following steps. When a node performing a boot procedure at a server slot is detected, a serial number of the node and a slot ID of the server slot are obtained. Then, a step is performed to determine whether the serial number exists in a first data row of a comparison list, and whether the first data row is corresponding to the slot ID. When the first data row is not corresponding to the slot ID, a data address recorded in the first data row is moved to a second data row corresponding to the slot ID. When not existing in the first data row, the serial number is used to update a third data row corresponding to the slot ID, and the data pointed by a data address recorded in the third data row are deleted.

8 Claims, 3 Drawing Sheets

METHOD FOR DETECTING A NODE OF A SERVER DEVICE

RELATED APPLICATIONS

This application claims priority to Taiwan Application Serial Number 98125583, filed Jul. 29, 2009, which is herein incorporated by reference.

BACKGROUND

1. Field of Invention

The present invention relates to a method for identifying a computer. More particularly, the present invention relates to a method for detecting a node of a server device.

2. Description of Related Art

A conventional high-density server includes a back panel, an enclosure management unit and a plurality of independently-operated motherboards, wherein the enclosure management unit is disposed on the back panel, and the motherboards are pluggable into the back panel respectively. Each of the motherboards has a base board management controller (BMC) chip used for administering the corresponding motherboard and recording the events of the corresponding motherboard.

In order to lower the hardware cost of the conventional high-density server, the BMC chip of each motherboard is removed, and only one back-panel BMC chip is disposed on a back panel to administering the respective motherboards which do not have BMC chips.

However, since these motherboards are not equipped with BMC chips, the back-panel BMC chip bases on the ID codes (such as Node 0-3) which are allocated beforehand to identify a motherboard located at a specific position of the back panel, and records an event log corresponding to the motherboard.

However, when a new motherboard is inserted into the back panel, due the pluggability of the motherboard, the system management controller chip can only base on the aforementioned ID codes to identify the existing motherboard, but cannot identify the new motherboard, and thus uses an event log which does not match with the new motherboard and is stored in memory, thus causing a lot of inconvenience and bothers.

Hence, it is actually an important and urgent topic for those in this industry to develop a method for detecting and identifying a motherboard in a server device for effectively improving the aforementioned shortcomings by not only lowering the hardware cost but also preventing inconvenience and bothers caused by using an inappropriate event log.

SUMMARY

An aspect of the present disclosure is to provide a method for detecting and identifying a motherboard in a server device for lowering the material cost of the server device by removing the BMC chips from the respective nodes.

Another aspect of the present invention is to provide a method for detecting and identifying a motherboard in a server device, thereby providing a node-identifying method with high correctness, so that a new node or a node from another slot can be identified correctly and a correct event log can be provided for lowering the probability of error.

In accordance with the aforementioned aspects, a method for detecting a node of a server device is provided, and includes the following steps. When a node which performs a boot procedure at a server slot installed in the service device is detected, a serial number used for identifying the node and a slot ID (Identification) allocated to the server slot are obtained. A step is performed to determine whether the serial number exists in a first data row of a comparison list, and whether the first data row is correctly corresponding to the slot ID. When the first data row is not correctly corresponding to the slot ID, a data address recorded in the first data row is moved to a second data row of the comparison list, wherein the slot ID is correctly corresponding to the second data row. When the serial number does not exist in the first data row, the serial number is used to update a third data row of the comparison list corresponding to the first slot ID, and the data pointed by a data address recorded in the third data row is deleted.

In one embodiment, a method for detecting a node of a server device is provided, and includes the following steps. A first node of the nodes is inserted into a first server slot of the server slots, and the first node is enabled to perform a boot procedure. A first slot ID of the first server slot node and a serial number of the first node transmitted from a BIOS (Basic Input/Output System) boot program of the first node are obtained. A first step is performed to determine whether the serial number exists in one of the data rows. When the result of the first step is yes, a second step is performed to determine whether the first data row is correctly corresponding to the first slot ID. When the result of the second step is no, a data address recorded in the first data row is moved to a second data row of the comparison list, wherein the first slot ID is correctly corresponding to the second data row.

In another embodiment, a method for detecting a node of a server device is provided, and includes the following steps. When a node is performing a boot procedure at a first server slot of the server slots is detected, a serial number used for identifying the node and a first slot ID allocated to the first server slot are obtained. A step is performed to determine whether the serial number exists in one of data rows. When the serial number does not exist in the data rows, the serial number is used to update one data row of the data rows corresponding to the first slot ID, and the data pointed by a data address recorded in the one data row are deleted.

Accordingly, the aforementioned embodiments can correctly identifying the position of the node which performs a boot procedure, thus reducing the probability of error.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
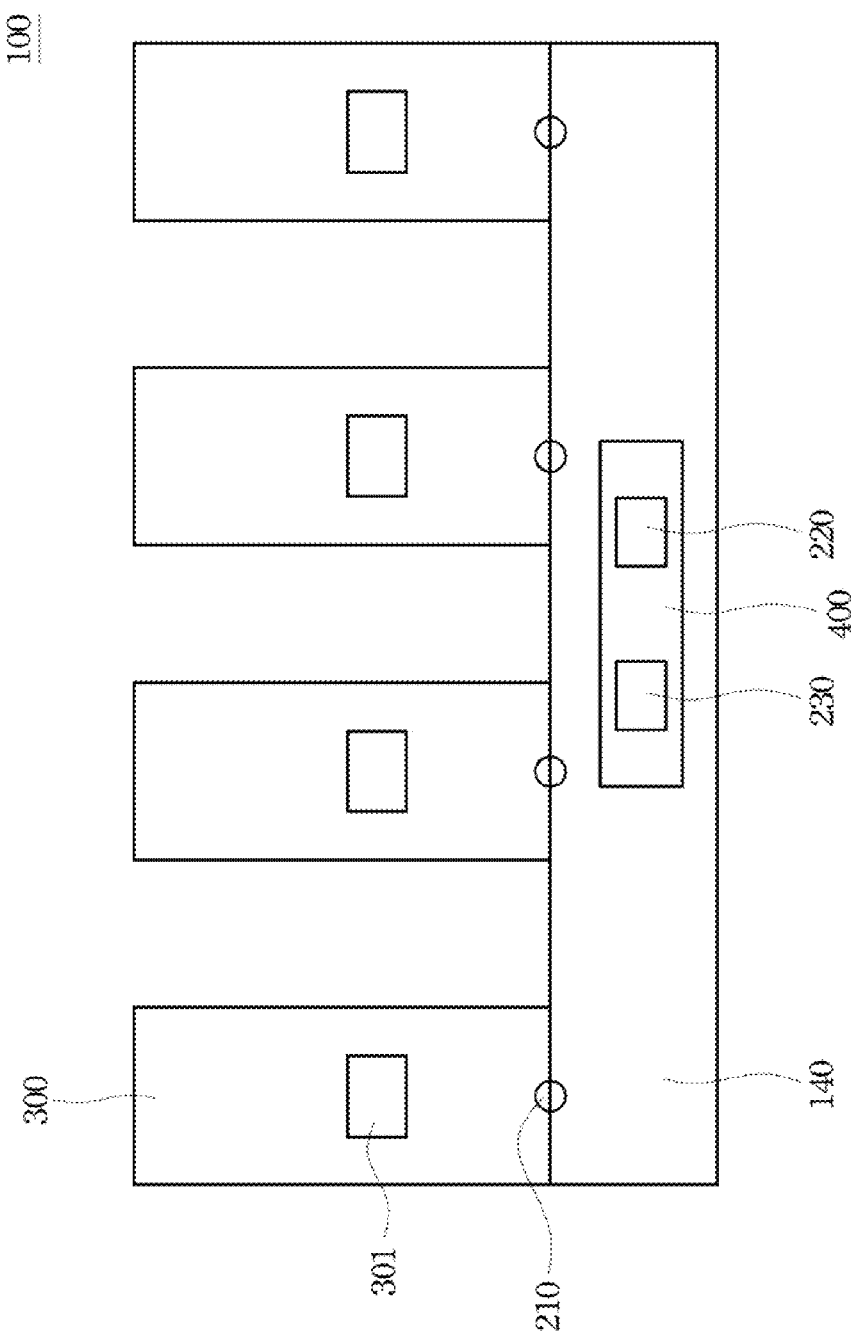
FIG. 1 is a schematic block diagram showing a server device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The present disclosure provides a method for detecting and identifying a node of a server device by using a comparison list and a distinguishable serial number owned by the node itself to identify the position at which the node is located. If there are user data originally existing in the server device, the originally-existing user data will be used continuously.

Referring to FIG. 1, FIG. 1 is a schematic block diagram showing a server device 100 according to an embodiment of the present invention. In the embodiment, the server device 100, such as a high-density server, includes a back panel 200 and a plurality of nodes 300.

The back panel 200 has a plurality of slots 210 and a BMC chip 220. The BMC chip 220 has a comparison list 400 and a memory 230. The memory 230 is divided into a plurality of data blocks (for example, their addresses are A0-A3) used for respectively recording event logs of the nodes 300. Each of the slots 210 is provided for inserting one node 300 therein, so that the nodes 300 can be pluggably arranged in parallel on the back panel 200, wherein each of the nodes has a serial number 301 which has a recognizable feature among the nodes, and the nodes can be considered as the motherboards with the same specification. When a node 300 is inserted into one of the nodes 210, the BMC chip 200 allocates a slot ID (such as N0, N1, N2, or N3 shown in FIG. 2) to the node 300.

Figure 2:
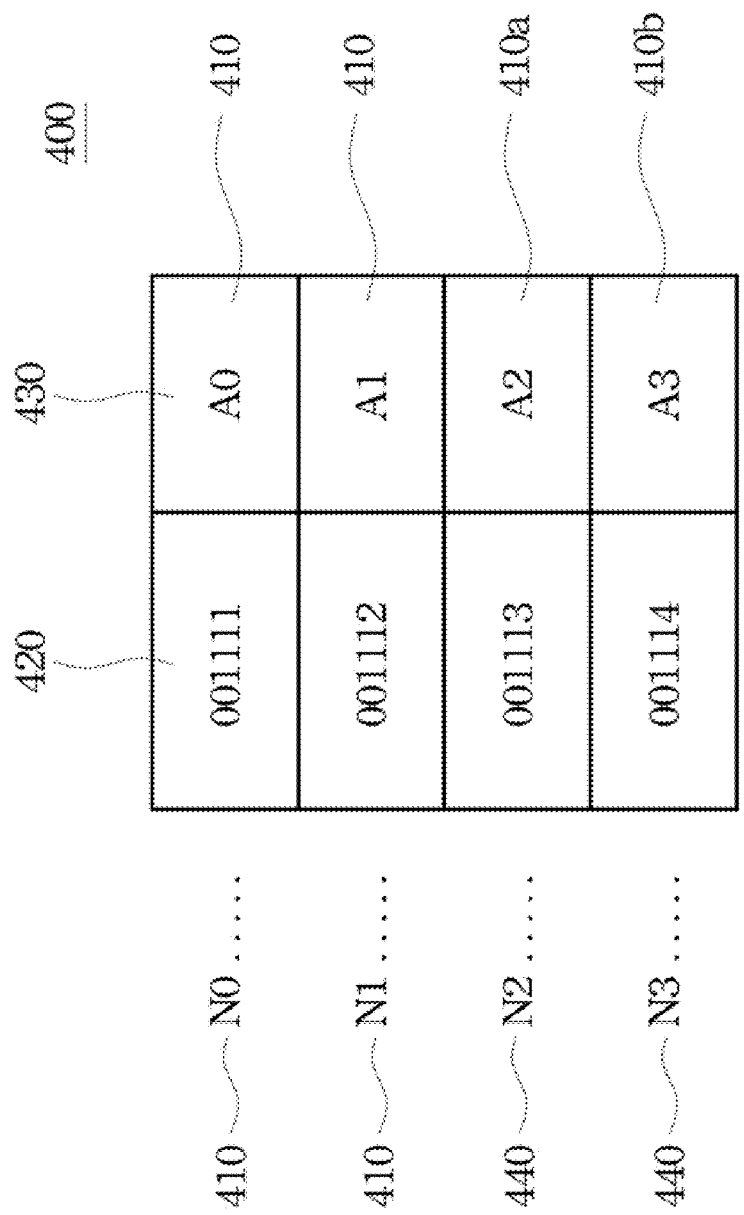
FIG. 2 is a schematic diagram showing a comparison list according to an embodiment of the present invention.

Referring to FIG. 1 and FIG. 2, FIG. 2 is a schematic diagram showing a comparison list 400 according to an embodiment of the present invention. The comparison list 400 has a plurality of data rows 410 (including data rows 410a and 410b). The number of the data rows 410 is equal to that of the slots 410 (such as four data rows and four slots), and the data rows 410 are one-to-one corresponding to the slot IDs of the slots 410 (such as N0-N3 shown in FIG. 2). Each of the data rows 410 has a serial number field 420 and a data address field 430, wherein the serial number field 420 is used for recording a serial number 301 of a node 300 inserted in a corresponding slot 210, and the data address field 430 is used for recording a directing path for directing to the aforementioned areas (such as A0-A3 in the data address fields 430 shown in FIG. 2).

Figure 3:
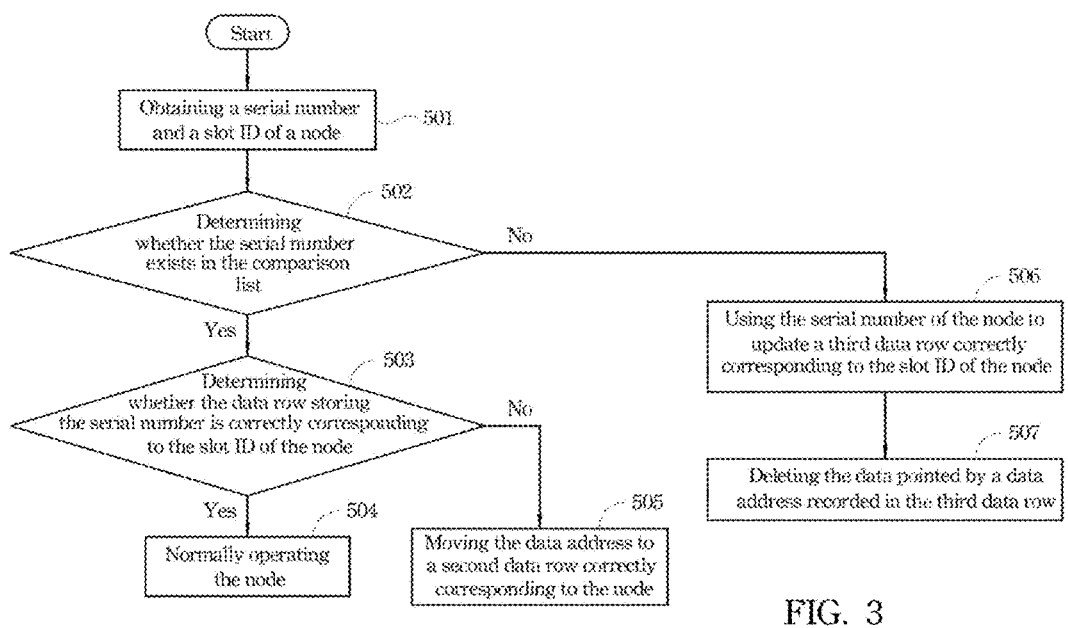
FIG. 3 is a schematic flow chart showing a method for detecting a node of a serve device according to an embodiment of the present invention.

Referring to FIG. 1 and FIG. 3 simultaneously, FIG. 3 is a schematic flow chart showing a method for detecting a node of a serve device according to an embodiment of the present invention. The BMC chip 220 performs this method in accordance with the following steps.

Step 501 is performed to obtain a serial number 301 of a node 300 and a slot ID (such as one of N0-N3 shown in FIG. 2) of a slot 210 into which the node 300 is inserted. When detecting and learning that one of the nodes 300 inserted in one of the slots 210 performs a boot procedure, the BMC chip 220 allocates a slot ID to the one of the nodes 300 (hereinafter the node 300 is used to represent the one of the nodes; and the slot 210 is used to represent the one of the slots 210), and a BIOS boot program of the node 300 transmits a serial number 310 of the node 300 with a recognizable feature to the BMC chip 220. For example, the BMC chip 220 allocates a slot ID, "N3", to the node 300 in accordance with the slot 210 in which the node 300 is inserted, and obtains a serial number 301, "001113", of the node 300.

Thereafter, step 502 is performed to determine whether the serial number exists in the comparison list 400. The BMC chip 220 compares the serial number 301 ("001113") of the node 300 with the data in the serial number field 420 of each data row 410 of the compassion list 400, thereby determining whether the serial number 301 of the node 300 exists in the data rows 410. If the result is yes, step 503 is performed, or step 506 is performed.

Step 503 is performed to determine whether the data row 410 storing the serial number 301 of the node 300 is correctly corresponding to the slot ID corresponding to the node 300. When it is determined that the aforementioned serial number 301 has already existed in one data row 410 (hereinafter called a first data row 410a), the BMC chip 220 compares the slot ID of the node 300 with the first data row 410a in the comparison list, thereby determining whether the first data row 410a is correctly corresponding to the slot ID of the node 300. If the result is yes, step 504 is performed, or step 505 is performed.

Continuing with the example described above, when the BMC chip 220 has compared and found that the data "001113" exists in the serial number field 420 of the first data row 410a, and that the slot ID recorded in the first data row 410a is "N2" but not "N3", it is indicated that the node 300 is switched to be inserted in another slot 210 corresponding to the slot ID "N3" instead of the slot 210 with the slot ID "N2". In other words, the first data row 410a is not correctly corresponding to the slot ID of the slot corresponding to the node 300, and then step 505 is performed.

On the other hand, In case the result of step 503 is yes, meaning that the node 300 is still inserted in the original slot 210 with the slot ID "N2" recorded in the first data row 410a, step 504 is performed to normally operate the node 300. In other words, when the first data row 410a is correctly corresponding to the slot ID ("N2") of the node 300, the data address field 430 of the first data row 410a in the comparison list 400 can be provided for the BMC chip 220 to access the event log of the node 300.

Step 505 is performed to move the data address to the data row 410 correctly corresponding to the node 300. When the first data row 410a is not correctly corresponding to the slot ID of the node 300, a directing path recorded in the data address field 430 of the first data row 410a is moved to a data address field 430 of another data row 410 (hereinafter called a second data row 410b) correctly corresponding to the slot ID of the node 300, thereby enabling the BMC chip 220 to use the event log in the corresponding data block via the directing path recorded in the data address field 430 of the second data row 410b.

Continuing with the example described above, when the BMC chip 220 has compared and found that the slot ID corresponding to the first data row 410a is not "N3" but "N2", the BMC chip 220 bases on the data address field 430 of the first data row 410a (recording a slot ID "N2"), to move the directing path "A2" recorded therein to another data address field 430 (originally recording a directing path "A3") of the second data row 410b (recording a slot ID "N3") currently corresponding to the node 300 (its current slot ID is "N3").

If the result of step 502 is no, step 506 is performed to use the serial number 301 of the node 300 to update another data row 410 which is correctly corresponding to the slot ID of the node 300. When the serial number 301 does not exist in any one of the data rows 410, the BMC chip 220 records the serial number 301 of the node 300 into a serial number field 420 of another data row 410 (hereinafter called a third data row) which is corresponding to the slot ID of the node 300.

In another example, when the BMC chip 220 detects that the serial number 301 ("001116") does not exist in any one of the data rows 410 and meanwhile the slot ID of the node 300 is "N3", the BMC chip 220 bases on the second data row 410b (recording a slot ID "N3") which is currently corresponding to the node, to record the serial number 301, "001116, into the serial number field 420 of the second data row 410b.

On the other hand, when detecting that the slot 210 corresponding to the second data row 410 (the slot ID recorded therein is "N3") does not have any node inserted therein, i.e. the detection result is "Null", the BMC chip 220 deletes the data recorded in the serial data field 420 of the second data row 410b (recording a slot ID "N3").

After step 506, step 507 is performed to delete the data pointed by a data address recorded in the third data row. The BMC chip 220 then bases on a data address (for example, its directing path is "A3") recorded in the data address field 430, to delete the data pointed by the data address.

To sum up, the embodiments of the present disclosure have the advantages of not only lowering hardware cost by not needing to add hardware for a concentrated management mechanism, but also overcoming inconvenience and bothers caused by the node 300 using an inappropriate event log.

For convenience of explanation, the first data row 410a, the second data row 410b and the third data row described above in the present disclosure all are one of the data rows, and it does not mean that the first data row 410a, the second data row 410b and the third data row are different units.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for detecting a node of a server device, comprising:
   when a node which performs a boot procedure at a first server slot of a plurality of server slots installed in the service device is detected, obtaining a serial number and a first slot ID (Identification), wherein the serial number has a recognizable feature for identifying the node, and the first slot ID is allocated to the first server slot;
   determining whether the serial number exists in a first data row of a comparison list, and whether the first data row is correctly corresponding to the first slot ID; and
   when the first data row is not correctly corresponding to the first slot ID, moving a data address recorded in the first data row to a second data row of the comparison list, wherein the first slot ID is correctly corresponding to the second data row;
   when the serial number does not exist in the first data row, using the serial number to update a third data row of the comparison list corresponding to the first slot ID, and deleting the data pointed by a data address recorded in the third data row.

2. The method as claimed in claim 1, wherein the comparison list comprises a plurality of data rows which are corresponding to slot IDs of the server slots respectively.

3. The method as claimed in claim 2, wherein each of the data rows has a serial number field and a data address field.

4. A method for detecting a node of a server device, wherein the server device has a plurality of server slots installed therein and a comparison list, and the server slots are provided for inserting a plurality of the nodes and allocating slot IDs to the nodes respectively, and the comparison list has a plurality of data rows which are corresponding to the slot IDs respectively, the method comprising:
   inserting a first node of the nodes into a first server slot of the server slots, and enabling the first node to perform a boot procedure;
   obtaining a first slot ID of the first server slot and a serial number of the first node transmitted from a BIOS (Basic Input/Output System) boot program of the first node;
   determining whether the serial number exists in one of the data rows;
   when the serial number exists in the first data row, determining whether the first data row is correctly corresponding to the first slot ID; and
   when the first data row is not correctly corresponding to the first slot ID, moving a data address recorded in the first data row to a second data row of the comparison list, wherein the first slot ID is correctly corresponding to the second data row.

5. The method as claimed in claim 4, wherein each of the data rows has a serial number field and a data address field.

6. A method for detecting a node of a server device, wherein the server device has a plurality of server slots installed therein and a comparison list, and the server slots are provided for inserting a plurality of the nodes and allocating slot IDs to the nodes respectively, and the comparison list has a plurality of data rows which are corresponding to the slot IDs respectively, the method comprising:
   when a first node which performs a boot procedure at a first server slot of the server slots is detected, obtaining a serial number and a first slot ID, wherein the first node is one of the nodes, and the serial number is used for identifying the first node, and the first slot ID is allocated to the first server slot;
   determining whether the serial number exists in one of the data rows; and
   when the serial number does not exist in the data rows, using the serial number to update one data row of the data rows corresponding to the first slot ID, and deleting the data pointed by a data address recorded in the one data row.

7. The method as claimed in claim 6, wherein each of the data rows has a serial number field and a data address field.

8. The method as claimed in claim 6, wherein the server device is a high-density server.

* * * * *